United States Patent

Nakanishi et al.

Patent Number: 6,111,003
Date of Patent: Aug. 29, 2000

[54] SILICONE RUBBER COMPOSITION

[75] Inventors: Koji Nakanishi, Kanagawa Prefecture; Takahiro Sato, Chiba Prefecture, both of Japan

[73] Assignee: Dow Corning Toray Silicone Co., Ltd., Tokyo, Japan

[21] Appl. No.: 09/351,976

[22] Filed: Jul. 12, 1999

Related U.S. Application Data

[63] Continuation of application No. 08/960,279, Oct. 29, 1997, abandoned.

[30] Foreign Application Priority Data

Oct. 29, 1996 [JP] Japan ..................................... 8-303737

[51] Int. Cl.[7] .......................... C08K 5/5419; C08K 3/36; C08L 83/06; C08L 83/07
[52] U.S. Cl. .......................... 524/265; 524/492; 524/860; 524/866
[58] Field of Search ..................................... 524/265, 492, 524/860, 866

[56] References Cited

U.S. PATENT DOCUMENTS

| | | | |
|---|---|---|---|
| 4,131,588 | 12/1978 | Smith, Jr. | 524/789 |
| 4,889,770 | 12/1989 | Ona et al. | 528/18 |
| 5,179,148 | 1/1993 | Inoue et al. | 524/265 |
| 5,223,595 | 6/1993 | Stepp et al. | 528/14 |
| 5,409,978 | 4/1995 | Hamada et al. | 524/265 |
| 5,708,054 | 1/1998 | Mine et al. | 528/14 |

*Primary Examiner*—Tae Yoon
*Attorney, Agent, or Firm*—William F. Boley

[57] ABSTRACT

A silicone rubber composition that has excellent discharge and flow characteristics prior to its cure and that cures into a highly transparent silicone rubber comprises:

(A) polyorganosiloxane, (B) microparticulate silica, (C) methyloligosiloxane endblocked at one molecular chain terminal by silanol and endblocked at the other terminal by trimethylsiloxy, and (D) a curing agent.

9 Claims, No Drawings

SILICONE RUBBER COMPOSITION

This application is a continuation of U.S. patent application Ser. No. 08/960,279, filed on Oct. 29, 1997 now abandoned.

BACKGROUND OF THE INVENTION

This invention relates to silicone rubber compositions. More particularly, this invention relates to a silicone rubber composition that prior to curing has excellent discharge and flow characteristics and that cures into a highly transparent silicone rubber.

The use of low-molecular-weight organosilicon compounds to improve the storage stability of silicone rubber compositions is already known. These organosilicon compounds are generally known as "plasticizers". As an example of these plasticizers, U.S. Pat. No. 2,890,188 teaches the use of diorganooligosiloxane endblocked at both terminals by silanol. Among plasticizers of this type, α,ω-dimethyloligosiloxanediols are widely used as plasticizers for silicone rubber compositions. In addition, Japanese Patent Publication (Kokoku) Number Hei 4-22179 (22,179/1991) teaches the use of hexaorganodisilazane as plasticizer while Japanese Patent Application Laid Open (Kokai or Unexamined) Number Hei 5-140457 (140,457/1993) teaches plasticizer in the form of a diphenylsiloxane unit-containing organooligosiloxane endblocked by silanol at a single terminal.

However, silicone rubber compositions containing α,ω-dimethyloligosiloxanediol plasticizers suffer from several problems: (i) they have poor discharge or flow characteristics prior to their cure, and (ii) they cure into silicone rubbers with an impaired transparence. The use of a silazane plasticizer, although not causing a decline in the transparency of the silicone rubber, does cause the silicone rubber to yellow during molding. Finally, a poor transparency is exhibited by silicone rubber compositions that contain plasticizer in the form or diphenylsiloxane unit-containing oligosiloxane endblocked by silanol at a single terminal.

The object of the present invention is to provide a silicone rubber composition that has excellent discharge characteristics and flow characteristics prior to its cure and that cures into a highly transparent silicone rubber.

SUMMARY OF THE INVENTION

A silicone rubber composition that has excellent discharge and flow characteristics prior to its cure and that cures into a highly transparent silicone rubber comprises:
(A) polyorganosiloxane,
(B) microparticulate silica,
C) methyloligosiloxane endblocked at one molecular chain terminal by silanol and endblocked at the other terminal by trimethylsiloxy. and
(D) a curing agent.

Because the present silicone rubber comprises components (A) to (D) and in particular because it contains the special methyloligosiloxane (C), the instant composition is characterized by excellent discharge and flow characteristics prior to its cure and by its ability to cure into a highly transparent silicone rubber.

DETAILED DESCRIPTION OF THE INVENTION

The present invention produces a silicone rubber composition comprising (A) 100 weight parts polyorganosiloxane expressed by the average compositional formula $R_aSiO_{(4-a)/2}$ in which R represents substituted and unsubstituted monovalent hydrocarbon groups and a is a number from 1.95 to 2.05.
(B) 5 to 100 weight parts microparticulate silica.
(C) 0.05 to 20 weight parts of a methyloligosiloxane plasticizer expressed by general formula (1)

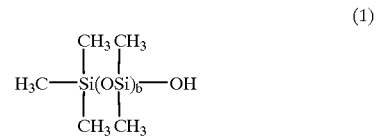

in which b is from 1 to 50 and
(D) curing agent in an amount sufficient to cure the instant composition.

The component (A) used in the present invention is polyorganosiloxane described by the general formula $R_aSiO_{(4-a)/2}$. R in this formula represents a sin-ie selection or a plural number of selections from substituted and unsubstituted monovalent hydrocarbon groups, for example, alkyl such as methyl, ethyl, propyl, and butyl; alkenyl such as vinyl, and allyl; aryl such as phenyl, and tolyl; cycloalkyl such as cyclohexyl; and the preceding groups in which all or part of the carbon-bonded hydrogen has been substituted by halogen, or a cyano group, for example, chloromethyl, trifluoropropyl, and cyanomethyl. The subscript a has a value from 1.90 to 2.05.

The polyorganosiloxane (A) is exemplified by vinyldimethylsiloxy-endblocked polymethylsiloxanes, vinyldimethylsiloxy-endblocked vinylmethylsiloxane-dimethylsiloxane copolymers, vinyldimethylsiloxy-endblocked dimethylsiloxane-methylphenylsiloxane copolymers, vinyldimethylsiloxy-endblocked dimethylsiloxane-diphenylsiloxane copolymers, trimethylsiloxy-endblocked dimethylsiloxane-vinylmethylsiloxane copolymers, vinyldimethylsiloxy-endblocked methyl(3,3,3-trifluoropropyl)polysiloxanes, and vinyldimethylsiloxy-endblocked dimethylsiloxane-methyl(3,3,3-trifluoropropyl)siloxane copolymers. The range for the degree of polymerization for component (A) is preferably from 100 to 30,000 and particularly preferably from 1,000 to 20,000. Combinations of the various types of polyorganosiloxanes described above can also be used in the present invention.

The microparticulate silica (B) used in the present invention is a reinforcing filler whose function is to increase the mechanical strength of the cured product. This reinforcing filler is exemplified by precipitated silica, fumed silica, and calcined silica. These fillers can be used without modification, but can also be used after a partial surface treatment with an organosilicon compound such as hexamethyldisilazane, trimethylchlorosilane, dimethyldichlorosilane, and the like. The subject microparticulate silica preferably has a specific surface area of at least 50 m²/g and more preferably of at least 200 m²/g. Component (B) is added at from 5 to 100 weight parts per 100 weight parts component (A).

The component (C) used by the present invention is the component that characterizes the present invention. This component functions to inhibit the pseudo-crosslinking that arises due to interaction between the polyorganosiloxane (A) and microparticulate silica (B) and in particular induces a substantial improvement in the transparency of the silicone rubber. In addition. component (C) also functions as a plasticizer to improve the discharge and flow characteristics of the uncured silicone rubber composition during its application in injection or extrusion molding.

Component (C) is the methyloligosiloxane compound described by general formula (1),

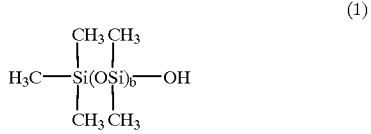

The subscript b in this formula should be from 1 to 50 and is preferably from 1 to (A). Component (C) is added at from 0.05 to 20 weight parts per 100 weight parts component (A).

The component (D) used in the present invention is a curing agent whose function is to induce the cure of the present composition. Organoperoxides are typical of this curing agent and are specifically exemplified by dicumyl peroxide, di-tert-butyl peroxide, tert-butyl cumyl peroxide, 2,5-dimethyl-2,5-di(tert-butylperoxy)hexane, 2,5-dimethyl-2,5-di(benzoylperoxy)hexane, 2,5-dimethyl-2,5-tert-butylperoxy)-3,3,5-trimethylcyclohexane, benzoyl peroxide, o-methylbenzoyl peroxide, and p-methylbenzoyl peroxide. The organoperoxide should be added in an amount sufficient to cure component (A), and the range from 0.1 to 15 weight parts per 100 weight parts component (A) is generally desirable.

When the polyorganosiloxane (A) contains alkenyl such as vinyl, the curing agent can take the form of an addition-reaction catalyst plus polyorganohydrogensiloxane bearing at least 3 silicon-bonded hydrogen atoms in each molecule. The subject polyorganohydrogensiloxane is exemplified by polymethylhydrogensiloxane and dimethylsiloxane-methylhydrogensiloxane copolymers. Its degree of polymerization is desirably from 3 to 700. and it must be added in a quantity that provides a value from 0.5:1 to 20:1 for the ratio of the total number of moles of silicon-bonded hydrogen in (D) to the total number of moles of alkenyl in (A). In this case the addition-reaction catalyst can be chloroplatinic acid: chloroplatinic acid dissolved in an alcohol, ketone, or ether; chloroplatinic acid/olefin complexes; chloroplatinic acid/alkenylsiloxane complexes; or platinum carried on a support. This catalyst is desirably added at from 0.1 to 500 weight parts for each 1,000,000 weight parts of the combined amount of components (A) to (D). A cure retardant can be used in combination with this particular type of curing agent for the purpose of securing a suitable use time. The cure retardant is exemplified by alkyl alcohols, eneyne compounds, hydrazine compounds, triazole compounds, phosphines, organic amines.

The composition according to the present invention can be prepared simply by mixing components (A) to (D) to homogeneity. The additives heretofore known for addition to the usual silicone rubber compositions may be added to the present composition on an optional basis. These additives are exemplified by extender fillers, pigments, heat stabilizers, flame retardants, adhesion promoters, and additives that provide thermal conductivity.

EXAMPLES

The invention will be explained more specifically below through working examples, in which parts denotes weight parts. The physical properties and transparency of the silicone rubbers and the discharge characteristics of the silicone rubber compositions were measured using the following methods. The physical properties of the silicone rubbers were measured by the methods described in JIS K6301. "Physical Test Methods for Vulcanized Rubbers".

The plasticity was measured by the method described in JIS C2123. The details of this method are provided in the following.

The silicone rubber compound test specimen was fabricated and placed between 2 sheets of cellophane paper. The test specimen took the form of a 2 ml cylinder. The test specimen was then inserted between parallel plates held at 25° C. and a load of 5 kg was applied from above. After 3 minutes the scale on the dial gage was read to hundredths of millimeters and the height of the test specimen was recorded. This value is reported as the plasticity in mm×100.

Transparency measurement was carried out using the method described in JIS K6714. which is used to measure the transparence of methacrylate sheet for aircraft. A silicone rubber block with a thickness of 6 mm was molded and used as the measurement sample. The measurements were divided into total light transmittance, parallel light transmittance, and scattered light transmittance.

Larger values for the parallel light transmittance are indicative of a better transparency. On the other hand, a ground glass-like condition gives larger values for the scattered light transmittance. The overall light transmittance is the sum of the parallel light transmittance and the scattered light transmittance.

To measure the discharge characteristics, the silicone rubber composition was fed into a small extruder under the conditions listed below and the mass, in grams, of silicone rubber composition discharged each minute was measured.

Extruder conditions:

screw diameter: 20 mm, L/D=10 die diameter: 1 mm, L/D=10 barrel temperature: 70° C.

die temperature: 70° C.

screw rpm: 30, 50, or 100

REFERENCE EXAMPLE 1

Synthesis of Dimethyloligosiloxane Endblocked by Silanol at One Molecular Chain Terminal and by Trimethylsilyl at the Other Terminal Operating under a nitrogen current, 394 g sodium acetate and 500 ml toluene were introduced into a 2-liter four-neck flask equipped with a stirrer, addition funnel, and thermometer. After azeotropic drying and cooling to 40° C., 435 g trimethylchlorosilane was added dropwise. The reaction was completed by then stirring for 3 hours. The salt product was filtered off and washed with toluene. The filtrate was recovered to give a 50% toluene solution of acetyltrimethylsilane.

Again, while operating under a nitrogen current, 801 g hexamethylcyclotrisiloxane and 1,000 g of the 50% toluene solution of acetyltrimethylsilane prepared above were introduced into a 5-L four-neck flask equipped with a stirrer, addition funnel, and thermometer. 25 g Zinc chloride was added and the flask was heated under reflux for 12 hours. After the end of the reaction, 40 ml triethylamine was added to precipitate the zinc chloride. The supernatant solution was recovered and combined with 30 ml acetic acid and washed twice with water. The low boilers were then distilled out to yield siloxane with the following formula.

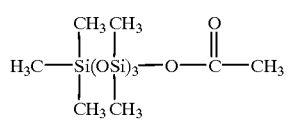

While operating under a nitrogen current, 1,250 g of the preceding siloxane, 1,400 ml toluene, 1,500 ml water, and 410 g sodium bicarbonate were introduced into a 5-liter four-neck flask equipped with a stirrer, addition funnel, and thermometer. 20 ml Triethylamine was then added dropwise followed by stirring at room temperature for 16 hours. After completion of acetyl group hydrolysis, the product was washed twice with water, the organic layer was recovered, and the organic solvent was then distilled off to give 836 g silanol- and trimethylsilyl-endblocked dimethyloligosiloxane with the following formula.

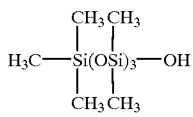

EXAMPLE 1

The following were introduced into a kneader mixer and mixed to homogeneity:

100 parts vinyldimethylsiloxy-endblocked dimethylsiloxane-vinylmethylsiloxane copolymer gum, with a degree of polymerization of 3,000, 99.86 mole percent dimethylsiloxane units, and 0.14 mole percent vinylmethylsiloxane units, 40 parts fumed silica with a specific surface of 200 m$^2$/g, and 8 parts of the dimethyloligosiloxane endblocked by silanol at one molecular chain terminal and by trimethylsilyl at the other terminal that was synthesized in Reference Example 1.

This was followed by heating for 60 minutes at 175° C. to give a silicone rubber base compound. The plasticity and discharge characteristics where measured on this silicone rubber base compound. A heat-curable silicone rubber composition was also prepared by mixing 0.8 part of a 50 weight percent silicone oil paste of 2,5-dimethyl-2.5-di(tert-butylperoxy)hexane into 100 parts of the above-described silicone rubber base. 2 mm-Thick and 6 mm-thick silicone rubber sheets were fabricated by press-molding this silicone rubber composition at 170° C. for 10 minutes and then heating in an oven at 200° C. for 2 hours. The physical properties were measured on the 2 mm-thick silicone rubber sheet, while the transparency was measured on the 6 mm-thick silicone rubber sheet. The measurement results are reported in Table 1.

COMPARATIVE EXAMPLE 1

A silicone rubber composition was prepared as in Example 1, but in this case using 8 parts dimethyloligosiloxane endblocked at both terminals by silanol, with average degree of polymerization of 8, in place of the dimethyloligosiloxane endblocked by silanol at one molecular chain terminal and by trimethylsilyl at the other terminal that was used in Example 1. The characteristics of this composition were measured as in Example 1, and these results are reported in Table 1.

COMPARATIVE EXAMPLE 2

A silicone rubber composition was prepared as in Example 1, but in this case using 8 parts hexamethyldisilazane and 2.0 parts water in place of the dimethyloligosiloxane endblocked by silanol at one molecular chain terminal and by trimethylsilyl at the other terminal that was used in Example 1. The characteristics of this composition were measured as in Example 1, and these results are reported in Table 1.

EXAMPLE 2

A heat-curable silicone rubber composition was prepared by mixing the following on a two-roll mill:

100 parts of the silicone rubber base compound prepared in Example 1

0.7 part trimethylsiloxy-endblocked dimethylsiloxane-methylhydrogensiloxane copolymer, with viscosity of 5 mPa·s at 25° C. and silicon-bonded hydrogen content of 0.8 weight percent, 0.02 part monomethyltris(monomethylbutynoxy)silane as cure retardant, and, as curing catalyst, chloroplatinic acid-vinyltetramethyldisiloxane complex in an amount sufficient to provide 5 ppm as platinum referred to the total weight.

2 mm-thick and 6 mm-thick silicone rubber sheets were fabricated by curing this silicone rubber composition by press-molding at 150° C. for 5 minutes and then heating in an oven at 200° C. for 2 hours. The characteristics of these silicone rubber sheets were measured as in Example 1, and these results are reported in Table 2.

COMPARATIVE EXAMPLE 3

A silicone rubber composition was prepared as in Example 1, but in this case using 8 parts dimethyloligosiloxane endblocked at both terminals by silanol, with average degree of polymerization of 8, in place of the dimethyloligosiloxane endblocked by silanol at one molecular chain terminal and by trimethylsilyl at the other terminal that was used in Example 2. The characteristics of the silicone rubber sheets obtained from this composition were measured as in Example 2, and these results are reported in Table 2.

COMPARATIVE EXAMPLE 4

A silicone rubber composition seas prepared as in Example 1, but in this case using 8 parts hexamethyldisilazane and 2.0 parts water in place of the dimethyloligosiloxane endblocked by silanol at one molecular chain terminal and by trimethylsilyl at the other terminal that was used in Example 2. The characteristics of the silicone rubber sheets obtained from this composition were measured as in Example 2, and these results are reported in Table 2.

TABLE 1

|  |  | Example 1 | Comparative Example 1 | Comparative Example 2 |
|---|---|---|---|---|
| characteristics of the base compounds |  |  |  |  |
| plasticity | (mm) | 236 | 240 | 195 |
| tack |  | absent | absent | present |
| discharge | (g/min) |  |  |  |

TABLE 1-continued

|  |  | Example 1 | Comparative Example 1 | Comparative Example 2 |
|---|---|---|---|---|
| characteristics |  |  |  |  |
| 30 rpm |  | 14.4 | 12.5 | — |
| 50 rpm |  | 27.5 | 23.2 | — |
| 100 rpm |  | 44.6 | 36.3 | — |
| sheet characteristics |  |  |  |  |
| specific gravity |  | 1.15 | 1.15 | 1.15 |
| durometer | (JIS A) | 52 | 53 | 49 |
| tensile strength | (kgf/cm$^2$) | 119 | 104 | 110 |
| elongation | (%) | 471 | 484 | 660 |
| sheet transparency |  |  |  |  |
| total light transmittance | (%) | 89 | 85 | 90 |
| parallel light transmittance | (%) | 74 | 45 | 75 |
| scattered light transmittance | (%) | 15 | 40 | 15 |
| sheet discoloration |  | none | none | yellow discoloration |

TABLE 2

|  |  | Example 2 | Comparative Example 3 | Comparative Example 4 |
|---|---|---|---|---|
| sheet characteristics |  |  |  |  |
| specific gravity |  | 1.15 | 1.15 | 1.15 |
| durometer | (JIS A) | 53 | 54 | 51 |
| tensile strength | (kgf/cm$^2$) | 105 | 101 | 107 |
| elongation | (%) | 415 | 436 | 580 |
| sheet transparency |  |  |  |  |
| total light transmittance | (%) | 87 | 84 | 89 |
| parallel light transmittance | (%) | 74 | 46 | 76 |
| scattered light transmittance | (%) | 13 | 38 | 13 |
| sheet discoloration |  | none | none | yellow discoloration |

What is claimed is:

1. A silicone rubber composition comprising (A) 100 weight parts polyorganosiloxane described by the average compositional formula $R_a SiO_{(4-a)/2}$ where R represents substituted and unsubstituted monovalent hydrocarbon groups and a is a number from 1.95 to 2.05, (B) 5 to 100 weight parts microparticulate silica, (C) 0.05 to 20 weight parts of a methyloligosiloxane plasticizer described by formula

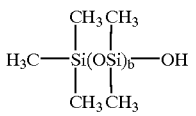

where b is from 1 to 50, and (D) curing agent in an amount sufficient to cure the composition wherein said curing agent is an organoperoxide.

2. The composition of claim 1 where the polyorganosiloxane has a degree of polymerization from 100 to 30,000.

3. The composition of claim 1 where the polyorganosiloxane has a degree of polymerization from 1000 to 20000.

4. The composition of claim 1 where the microparticulate silica has a specific surface area of at least 50 m$^2$/g.

5. The composition of claim 1 where the microparticulate silica has a specific surface area of at least 200 m$^2$/g.

6. The composition of claim 1 where b is from 1 to 20.

7. The composition ot claim 1 b is 3.

8. The composition of claim 1 where the organoperoxide is added in the range of from 0.1 to 15 weight parts per 100 parts of the polyorganosiloxane.

9. The composition of claim 1 where the polyorganosiloxane is selected from the group consisting of vinyldimethylsiloxy-endblocked polydimethylsiloxanes, vinyldimethylsiloxy-endblocked vinylmethylsiloxane-dimethylsiloxane copolymers, vinyldimethylsiloxy-endblocked dimethylsiloxane-methylphenylsiloxane copolymers, vinyldimethylsiloxy-endblocked dimethylsiloxane-diphenylsiloxane copolymers, trimethylsiloxy-endblocked dimethylsiloxane-vinylmethylsiloxane copolymers, vinyldimethylsiloxy-endblocked methyl(3,3,3-trifluoropropyl)polysiloxanes, and vinyldimethylsiloxy-endblocked dimethylsiloxane-methyl(3,3,3-trifluoropropyl)siloxane copolymers.

\* \* \* \* \*